United States Patent
Lam et al.

(10) Patent No.: US 6,765,790 B2
(45) Date of Patent: Jul. 20, 2004

(54) NOTEBOOK COMPUTER WITH METAL FRAME

(75) Inventors: Siu-Ming Lam, Taipei (TW); Cheng-Che Chen, Taoyuan (TW)

(73) Assignee: Quanta Computer, Inc., Taoyuan (TW)

( * ) Notice: Subject to any disclaimer, the term of this patent is extended or adjusted under 35 U.S.C. 154(b) by 51 days.

(21) Appl. No.: 10/281,485

(22) Filed: Oct. 28, 2002

(65) Prior Publication Data

US 2003/0227742 A1 Dec. 11, 2003

(30) Foreign Application Priority Data

Jun. 11, 2002 (TW) ........................................ 91208687 U

(51) Int. Cl.⁷ .............................................. H05K 5/02
(52) U.S. Cl. ...................... 361/683; 361/686; 312/223.2
(58) Field of Search .................. 361/680, 683, 361/684, 686, 687, 724, 725, 730, 752; 312/223.1, 223.2

(56) References Cited

U.S. PATENT DOCUMENTS

| | | | | |
|---|---|---|---|---|
| 5,164,542 A | * | 11/1992 | Hart | 174/35 MS |
| 6,504,711 B2 | * | 1/2003 | Wu et al. | 361/687 |
| 2002/0144032 A1 | * | 10/2002 | Kriege et al. | 710/62 |
| 2002/0154474 A1 | * | 10/2002 | Merz et al. | 361/683 |

* cited by examiner

Primary Examiner—Dean A. Reichard
Assistant Examiner—Carmelo Oliva
(74) Attorney, Agent, or Firm—Thomas, Kayden, Horstemeyer & Risley

(57) ABSTRACT

A notebook computer with a metal frame. The notebook computer comprises a housing, a metal frame, and a main board. The housing defines a plurality of first openings. The metal frame defines a plurality of second openings and a groove. Parts of the second openings correspond to the first openings. The main board is disposed on the metal frame, and includes a cable located in the groove of the metal frame.

15 Claims, 5 Drawing Sheets

NOTEBOOK COMPUTER WITH METAL FRAME

BACKGROUND OF THE INVENTION

1. Field of the Invention

The invention relates to a notebook computer; in particular, a notebook computer with a metal frame to enhance its structural strength.

2. Description of the Related Art

Users of personal computers have been liberated from the restrictions of desktop-only use with the introduction of portable "notebook" computers. The convenience and transportability of the notebook computer has produced a large and lucrative market for manufacturers of such machines.

Referring to FIG. 1a, a normal notebook computer 100 comprises a main portion 110, and a display 120 disposed on the main portion 110 in a rotatable manner. The main portion 110 is provided with a bottom cover 111 as shown in FIG. 1b.

Referring to FIG. 1b and FIG. 1c, to reduce the weight of the notebook computer 100, the bottom cover 111 is formed with an opening 1111. The opening 1111 is also used for expanded devices, such as a battery and an optical disc drive, to be extracted. In addition, the main portion 110 is provided with a top cover 114 corresponding to the bottom cover 111. A main board 113 is disposed on the bottom cover 111 and located in the main portion 110.

Furthermore, for the convenience of upgrading the notebook computer, the number of the openings is increased. Specifically, since the number of the openings is increased, the expanded devices can be conveniently replaced through the openings. Thus, when the notebook computer is upgraded, there is no need to detach the bottom cover. As shown in FIG. 2a and FIG. 2b, a bottom cover 111a of a main portion 110a is formed with an opening 1111a and an opening 1112a. The opening 1111a is used for the expanded device 112a to be extracted. The opening 1112 is used for hardware 115a to be extracted during the upgrade of the notebook computer, such as the replacement of a CPU on the main board 113a.

However, since the number of the openings is increased, the whole bottom cover becomes incomplete so as to affect the structural strength of the notebook computer. Also, the bottom cover is easily deformed during assembly so that it cannot properly support the notebook computer. As a result, the function of the notebook computer may also be affected.

In addition, since the structural strength of the bottom cover is not sufficient, the main board is difficult to position on the bottom cover during assembly.

Furthermore, since the bottom cover is plastic, additional attachments, such as bosses, must be mounted on the bottom cover to be combined with the top cover or the main board. Thus, the assembly becomes more complex.

Furthermore, the main board includes a cable, such as an antenna, that is placed on the bottom cover. However, in the conventional notebook computer, the cable is randomly disposed on the bottom cover. Thus, the cable may interfere with the assembly between the main board and the bottom cover.

SUMMARY OF THE INVENTION

In order to address the disadvantages of the aforementioned notebook computer, the invention provides a notebook computer with a metal frame so as to enhance structural strength.

Another purpose of this invention is to provide a notebook computer with easy assembly.

Accordingly, the invention provides a notebook computer. The notebook computer comprises a housing, a metal frame, and a main board. The housing defines a plurality of first openings. The metal frame defines a plurality of second openings and a groove. Parts of the second openings correspond to the first openings. The main board is disposed on the metal frame, and includes a cable located in the groove of the metal frame.

In a preferred embodiment, the metal frame is integrally formed with a plurality of attachments for assembling the housing and the main board thereon.

In another preferred embodiment, the metal frame is Al—Mg alloy.

In another preferred embodiment, the metal frame defines a plurality of third openings for reducing the weight of the metal frame.

In another preferred embodiment, the second opening is substantially larger than the corresponding first opening.

In another preferred embodiment, the number of the second openings is substantially larger than the number of the first openings.

The invention also provides a metal frame for a notebook computer including a housing and a main board. The metal frame comprises a body and a plurality of attachments. The body includes a first surface and a second surface opposite from the first surface. The housing is disposed on the first surface, and the main board is disposed on the second surface. The attachments are integrally formed on the body to assemble the housing and the main board on the body.

BRIEF DESCRIPTION OF THE DRAWINGS

The invention is hereinafter described in detail with reference to the accompanying drawings in which:

FIG. 1b is a bottom view of a bottom cover in FIG. 1a;

FIG. 1c is an exploded view of a main portion in FIG. 1a;

FIG. 2b is an exploded view of a main portion in FIG. 2a;

FIG. 3b is an exploded view of a main portion in FIG. 3a; and

FIG. 3c is a side view of a metal frame in FIG. 3a.

DETAILED DESCRIPTION OF THE INVENTION

Figure 1A:
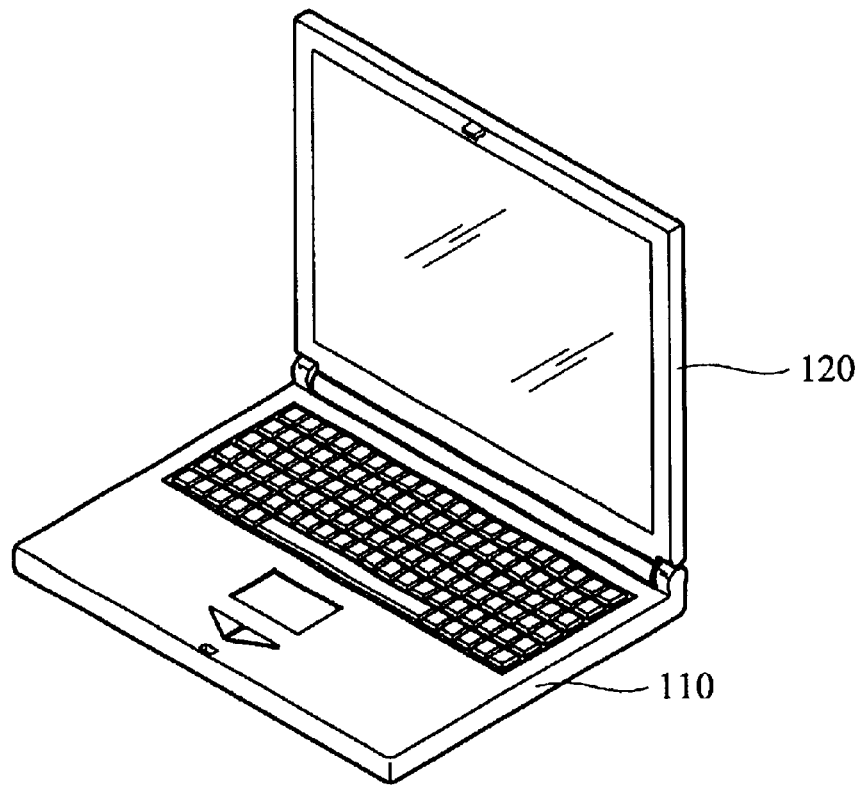
FIG. 1a is a schematic view of a conventional notebook computer.
Figure 1B:
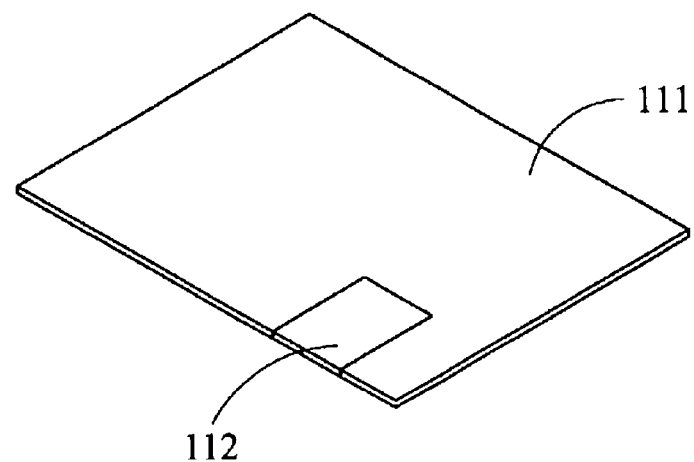
Figure 1C:
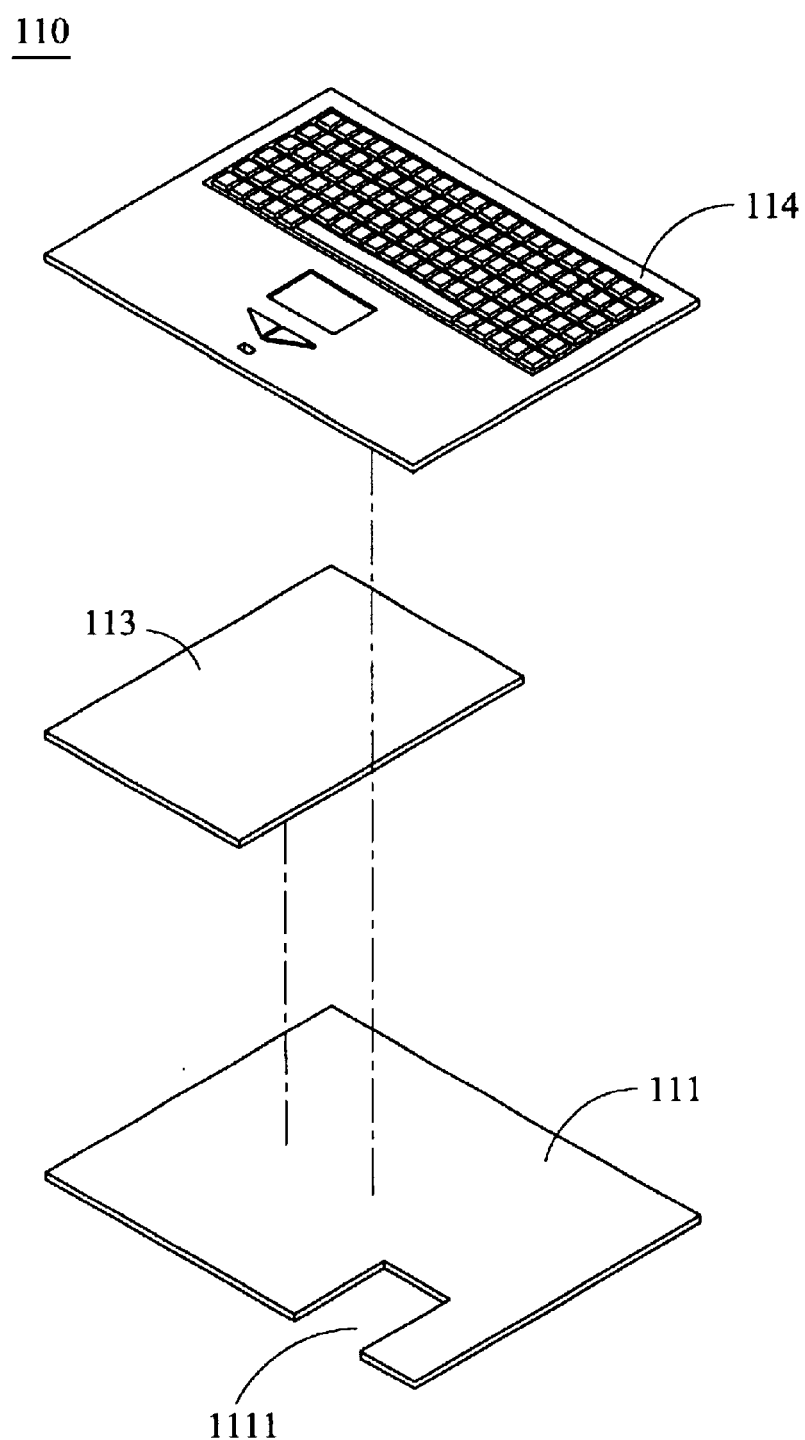
Figure 2A:
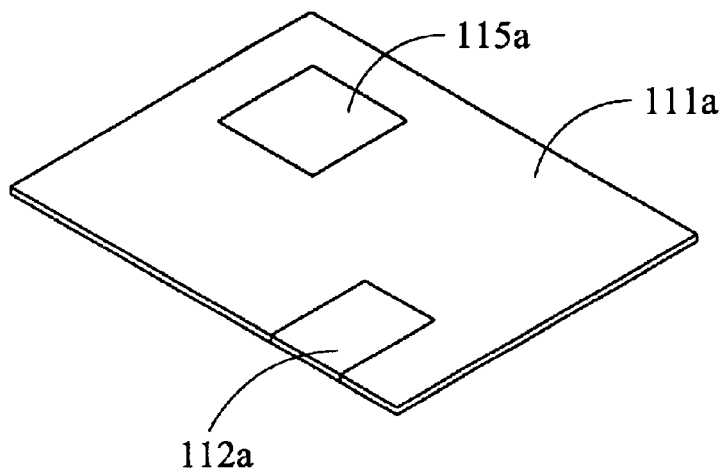
FIG. 2a is a bottom view of a bottom cover of another notebook computer.
Figure 2B:
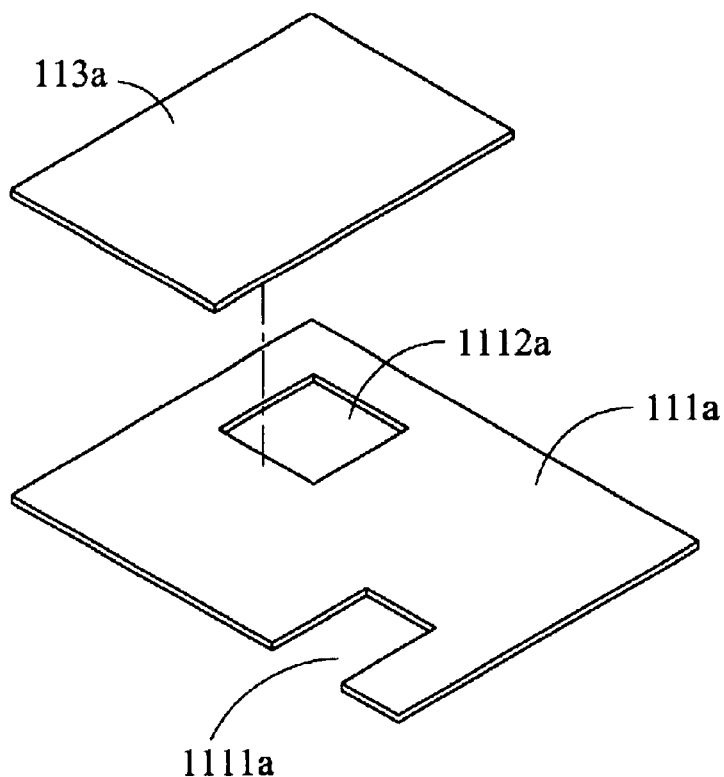
Figure 3A:
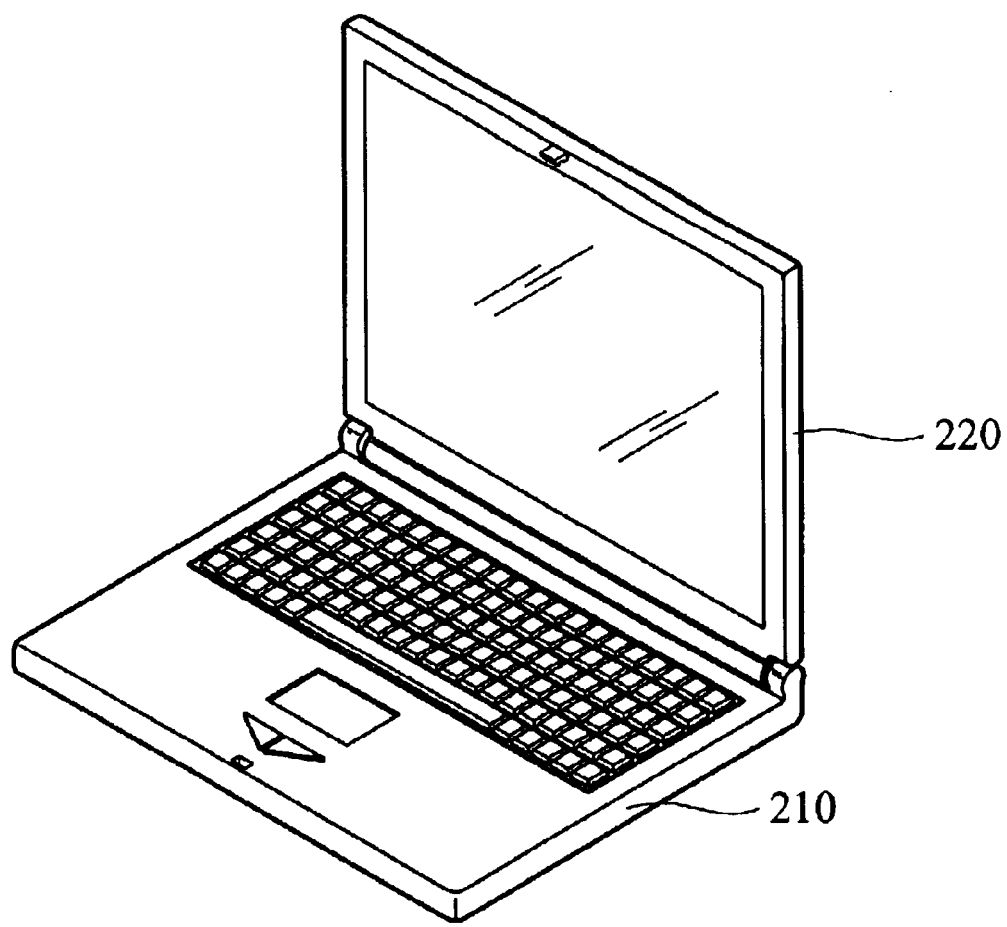
FIG. 3a is a schematic view of a notebook computer as disclosed in this invention.

Referring to FIG. 3a, a notebook computer 200 as disclosed in this invention comprises a main portion 210, and a display 220 disposed on the main portion 210 in a rotatable manner.

Figure 3B:
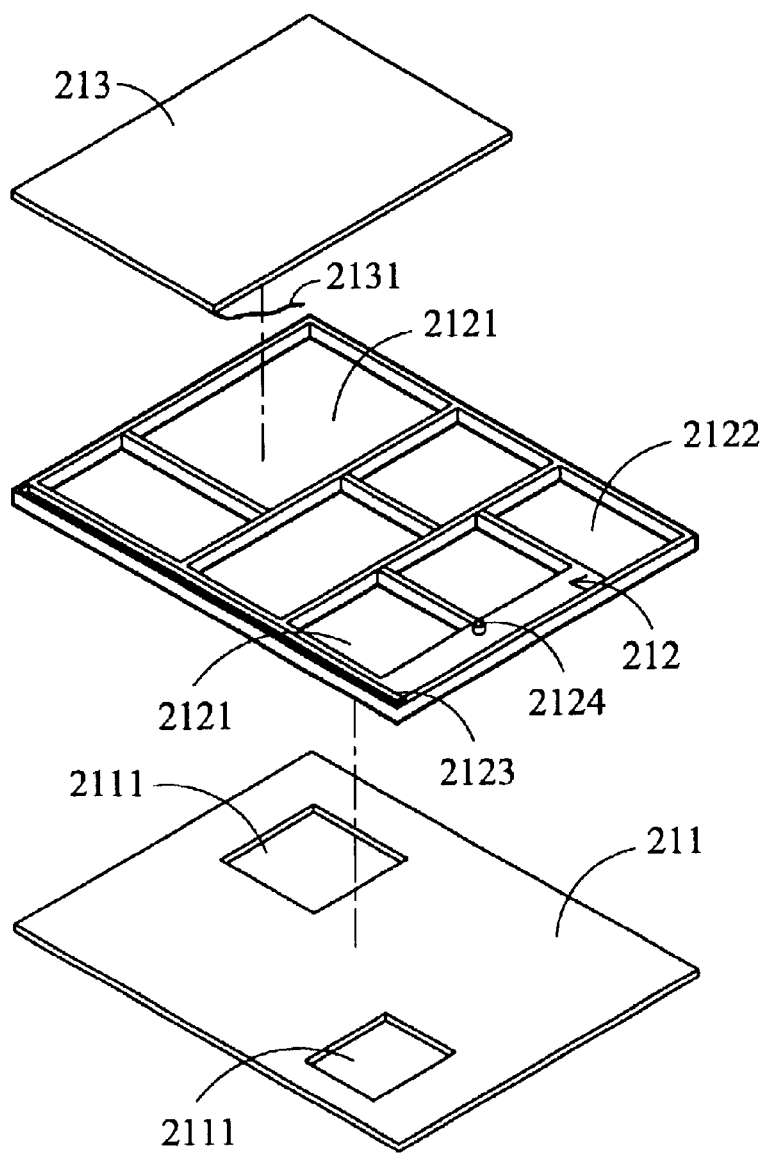

FIG. 3b is a partial schematic view of a main portion 210. The main portion 210 of the notebook computer 200 comprises a housing 211, a metal frame 212, and a main board 213. It is noted that in the figures, components that are not directly relative to the characteristic of this invention are omitted, such as a top cover.

The housing 211 is used as a base of the main portion 210, and is formed with a plurality of first openings 211. The first openings 211 are used for expanded devices to be replaced.

Figure 3C:
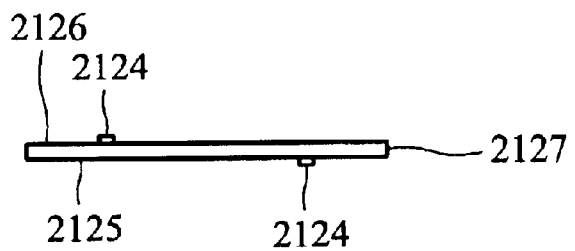

The metal frame 212 is disposed on the housing 211, and includes a body 2127 and a plurality of attachments 2124 as shown in FIG. 3b and FIG. 3c. The body 2127 of the metal frame 212 includes a first surface 2125 and a second surface 2126 opposite from the first surface 2125. The body 2127 of the metal frame 212 is also formed with a plurality of second openings 2121 and a groove 2123. As shown in FIG. 3b, parts of the second openings 2121 correspond to the first openings 2111 of the housing 211. It is noted that the number of the second openings 2121 is substantially larger than the number of the first openings 2111. Also, the second opening 2121 is substantially larger than the corresponding first opening 2111 so that the expanded device can be extracted conveniently. The attachments 2124 are integrally formed on the first surface 2125 and the second surface 2126 of the body 2127 of the metal frame 212 to assemble the housing 211 on the first surface 2125 of the metal frame 212 and assemble the main board 213 on the second surface 2126 of the metal frame 212.

It is understood that the metal frame may be of light material with certain strength, such as Al—Mg alloy.

The main board 213 includes a cable 2131, such as an antenna. When the main board 213 is disposed on second surface 2126 of the metal frame 212, the cable 2131 is located in the groove 2123 of the metal frame 212.

As stated above, since the metal frame is additionally disposed in the housing of the notebook computer, the main board can be properly supported. Thus, the main board is not easily deformed, and the function of the notebook computer can be maintained.

Furthermore, since the housing is fixed on the metal frame, the housing can be prevented from deforming due to external force. Thus, the whole structural strength of the notebook computer is enhanced.

In addition, since the metal frame is formed with a groove for the cable of the main board to be disposed therein, the assembly is more convenient.

Furthermore, since the attachments are integrally formed on the metal frame, the complexity of manufacture of the notebook computer is decreased. Thus, the assembly of the notebook computer is easier.

Furthermore, since the metal frame is provided with electrical conductivity, it can assist in grounding and EMI shielding.

Furthermore, for reducing the weight of the metal frame 212, the metal frame 212 is formed with a plurality of third openings 2122. As a result, the weight of the whole notebook computer is also reduced.

It is noted that when the main board 213 is disposed on the metal frame 212, the positions of the third openings 2122 do not interfere with such assembly.

While the invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above, and all equivalents thereto.

What is claimed is:

1. A notebook computer comprising:
   a housing with a plurality of first openings;
   a main board located in the housing;
   a metal frame located between the housing and the main board, with a plurality of second openings; and
   a groove set on the metal frame to receive a cable of the main board.

2. The notebook computer as claimed in claim 1, wherein parts of the second openings correspond to the first openings.

3. The notebook computer as claimed in claim 2, wherein the second opening is larger than the corresponding first opening.

4. The notebook computer as claimed in claim 1, wherein the number of the second openings is larger than the number of the first openings.

5. The notebook computer as claimed in claim 1, wherein the metal frame is integrally with a plurality of attachments for assembling the housing and the main board thereon.

6. The notebook computer as claimed in claim 1, wherein the metal frame is made of Al—Mg alloy.

7. The notebook computer as claimed in claim 1, wherein a plurality of third openings are set on the metal frame to reduce the weight of the metal frame.

8. A metal frame for a notebook computer, the notebook computer including a housing and a main board, the metal frame comprising:
   a body with a first surface and a second surface opposite the first surface, wherein the housing is disposed on the first surface, and the main board is disposed on the second surface;
   a plurality of attachments integrally formed on the body to assemble the housing and the main board on the body; and
   a groove set at the second surface of the body for receiving a cable of the main board.

9. The metal frame as claimed in claim 8, wherein the body is Al—Mg alloy.

10. The metal frame as claimed in claim 8, wherein a plurality of first openings are set on the housing, and a plurality of second openings are set on the body.

11. The metal frame as claimed in claim 10, wherein parts of the second openings correspond to the first openings.

12. The metal frame as claimed in claim 11, wherein the second opening is larger than the corresponding first opening.

13. The metal frame as claimed in claim 10, wherein the number of the second openings is larger than the number of the first openings.

14. The metal frame as claimed in claim 8, wherein the body defines a plurality of third openings for reducing the weight of the metal frame.

15. The metal frame as claimed in claim 8, wherein a plurality of first openings are set on the housing, and a plurality of second openings are set on the body, the second openings corresponding to the first openings respectively.

* * * * *